UNITED STATES PATENT OFFICE.

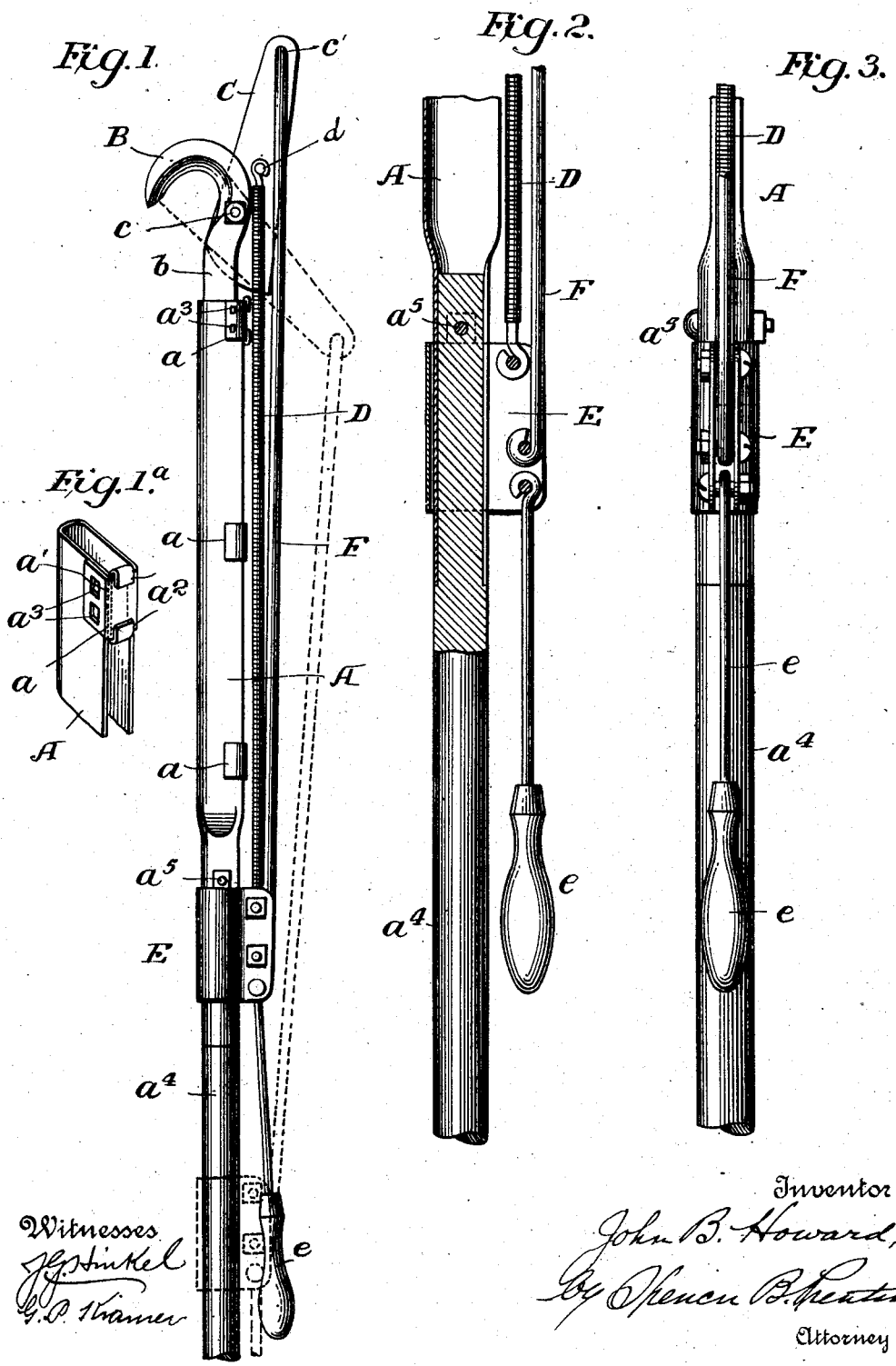

JOHN B. HOWARD, OF ST. JOHN, KANSAS.

PRUNING IMPLEMENT.

974,149.  Specification of Letters Patent.  Patented Nov. 1, 1910.

Application filed October 16, 1909.  Serial No. 523,047.

*To all whom it may concern:*

Be it known that I, JOHN B. HOWARD, a citizen of the United States, residing at St. John, in the county of Stafford and State of Kansas, have invented certain new and useful Improvements in Pruning Implements, of which the following is a specification.

My invention relates to implements for pruning or trimming trees, bushes and shrubs, and has for its object the production of a device of this character which is useful for cutting all moderate sizes of branches, from the largest and toughest capable of being cut by a pruning knife, down to the smallest twig.

In the use of pruning implements, as usually constructed, inefficiency in operation is encountered either in cutting large heavy branches, or small twigs. Several types of implements have been designed; one operated by a pull upon the handle, in which the leverage on the cutter, and hence the power exerted, is great. An example of this type is found in Patent No. 870,366, granted to me November 5, 1907. Such implements cut very well, especially thick branches and others which are to be taken off short, but twigs and the ends of small branches bend and are not readily cut. Another type comprises those implements which are held to the work by a handle and the knife or cutter then manipulated by a second handle, lever or other contrivance. Such implements cut the medium and small branches best but lack the power for the largest and toughest ones.

I have combined the mode of operation and the advantages of both types in a single implement, which may be operated either way, or both ways at the same time if desired, and comprises a body portion, a hook member having a shank in sliding connection therewith, a cutter, a spring and an operating rod connected to control the cutter, and a sleeve mounted on the body portion and provided with operating means.

The invention is embodied in the novel implement hereinafter described, and for a more complete understanding of which reference may be had to the following description taken in connection with the accompanying drawings which illustrate the invention.

In the drawings, Figure 1 is a side elevation of my improved pruning implement, the movable parts being shown by whole lines in normal position and by dotted lines in their position at the end of a cutting movement; Fig. 1$^a$ is a detail of the upper end of the handle member; Fig. 2 is an enlarged side elevation, partly in section, of the lower part of the same; and Fig. 3 is an enlarged front elevation of the said lower part.

Referring to the drawings it will be seen that the device consists of a handle member A made of sheet steel and formed up so as to provide a body portion partly closed at the back by the bent-over lugs $a$. In order to make a firm joint and good wearing surface at the upper open end of the handle member, the side opposite that upon which the upper connecting lug $a$ is formed is provided with a lug $a'$ underlying lug $a$ and having ends $a^2$ bent outwardly and then over lug $a$. Lug $a$ is fastened by indentations $a^3$ or in any other suitable manner. The lower end of the handle member is formed to receive the handle $a^4$, to which it is secured by a bolt $a^5$.

A hook member coöperates with the handle member, and is formed with a hook B, and a shank $b$ extending into and making a sliding connection with the handle member A. A knife C is pivoted to the hook member adjacent the hook upon a pivot $c$ and normally is held in a vertical position, by a tension spring D connected to a pin $d$ upon the knife, and also to an operating member E shown as a sleeve slidingly mounted upon the handle member. The forward movement of operating member E is limited by bolt $a^5$ which acts as a stop therefor.

F is an operating rod which connects operating member E with the outer or forward end of knife C at $c'$. A suitable handle $e$ is connected to operating member E.

The implement as thus constructed may be operated in two ways, namely, by a pull upon the main handle $a^4$, as described in my aforesaid patent, and by holding said handle and pulling upon operating handle $e$. In the first mentioned operation, sleeve E remains against stop $a^5$ and the hook member, which is normally held in its retracted position by the action of spring D; is drawn outwardly from the handle member, thus swinging knife C upon pivot $c$ and forcing its cutting edge through the branch held in hook B. Great cutting power is obtainable in this way. In the second-mentioned operation, the hook shank $b$ remains in handle member A, and operating handle $e$ is pulled, main handle $a^4$ being grasped in the other hand. This causes operating member E to move down upon the handle $a^4$, thereby rocking knife C upon its pivot $c$, until the parts assume the position shown by dotted lines in Fig. 1. In both operations, spring D returns the parts to their normal position after a cut.

I am aware that modifications of my structure as described may be made without departing from the invention, and these I aim to cover by the appended claims.

What I claim as new, and desire to secure by Letters Patent of the United States, is—

1. A pruning implement comprising a handle member and a hook member in sliding engagement therewith, a knife operatively pivoted upon said hook member, a sleeve slidably mounted upon said handle member, an operating connection between said sleeve and knife, and a spring operatively connected between said sleeve and hook member and arranged to be stretched by the outward movement of said hook member in a cutting operation or by the rearward movement of said sleeve to operate said knife.

2. A pruning implement comprising a handle member and a hook member in sliding engagement therewith, a knife operatively pivoted upon said hook member, a sleeve slidably mounted upon said handle member, an operating handle for said sleeve, a forward stop for said sleeve upon said handle member, an operating connection between said sleeve and knife, and a spring connected between said sleeve and hook member so as to be stretched by the outward movement of said hook member or by the rearward movement of said sleeve from said stop.

3. A pruning implement comprising a handle member, a hook member formed with a hook and having a shank in sliding connection with said handle member, a knife pivoted to said hook member adjacent said hook, an operating member slidably mounted on said handle member, an operating rod connected to said knife and said operating member, and a tension spring operatively connected between said operating member and hook member so as to be stretched by the outward movement of said hook member or by the rearward movement of said operating member.

4. A handle member for pruning implements comprising an open ended sheet metal hollow body portion formed at one side of the open end with a connecting lug bent around and secured to the body portion, and on the other side with a lug underlying said connecting lug and having ends bent outwardly and over said connecting lug.

5. A pruning implement comprising an open ended sheet metal hollow handle member formed at one side of the open end with a connecting lug bent around and secured to the handle member, and on the other side with a lug lying adjacent said connecting lug and having its ends bent over the edges thereof, a hook member having a shank extending within said handle member and in sliding engagement therewith, and a knife operatively mounted upon said hook member.

In testimony whereof I have affixed my signature, in presence of two witnesses.

JOHN B. HOWARD.

Witnesses:
C. C. HOAGLIN,
D. HAMMITT.